(12) United States Patent
Haji

(10) Patent No.: US 6,419,737 B1
(45) Date of Patent: Jul. 16, 2002

(54) CEMENTITIOUS POLYMERIC MATRIX COMPRISING SILICA ALUMINOUS MATERIALS

(75) Inventor: Anas Haji, Brussels (BE)

(73) Assignee: H.T.B.S. Corporation B.V., KN Rotterdam (NL)

( * ) Notice: Subject to any disclaimer, the term of this patent is extended or adjusted under 35 U.S.C. 154(b) by 0 days.

(21) Appl. No.: 09/485,354

(22) PCT Filed: Jun. 26, 1998

(86) PCT No.: PCT/BE98/00099
§ 371 (c)(1),
(2), (4) Date: Jan. 18, 2000

(87) PCT Pub. No.: WO99/03797
PCT Pub. Date: Jan. 28, 1999

(30) Foreign Application Priority Data

Jul. 15, 1997 (EP) .............................................. 97870107

(51) Int. Cl.$^7$ .............................................. C04B 35/19
(52) U.S. Cl. ........................ 106/600; 106/602; 501/106; 501/107
(58) Field of Search ................................. 106/600, 602; 501/106, 107

(56) References Cited

U.S. PATENT DOCUMENTS

| | | | |
|---|---|---|---|
| 3,830,173 A | 8/1974 | Hubble et al. | |
| 4,349,386 A | * 9/1982 | Davidovits | 264/333 |
| 4,472,199 A | * 9/1984 | Davidovits | 264/333 |
| 4,642,137 A | 2/1987 | Heitzmann et al. | |

FOREIGN PATENT DOCUMENTS

| | | |
|---|---|---|
| EP | 417 583 A2 | 3/1991 |
| FR | 2 169 864 | 9/1973 |
| WO | WO 93/21126 | 10/1993 |

* cited by examiner

*Primary Examiner*—Paul Marcantoni
(74) *Attorney, Agent, or Firm*—Knobbe, Martens, Olson & Bear, LLP

(57) ABSTRACT

A cementitious matrix consisting essentially of aluminosilicate polymer containing a liquid component of an aqueous solution of an alkali metal silicate having the formula $M_2O.RSiO_2.XH_2O$, in which: M is an alkali metal monovalent cation such K+ or Na+; R is the molar ratio of $SiO_2/M_2O$, where the range is between 0.5/1 and 9/1; and X is the amount of water, where the amount of water is between 30 and 70 wt %; and a powder component which contains the silico-aluminous reactive raw materials $Al_6Si_2O_{13}$ and $Al_2O_3.4SiO_2$, with a relative proportion between 40 and 60 wt %, where the particle size of both components ranges between 40 and 70 microns. The cementitious matrix has high mechanical strength and is resistant to high temperatures.

29 Claims, No Drawings

CEMENTITIOUS POLYMERIC MATRIX COMPRISING SILICA ALUMINOUS MATERIALS

This is the U.S. national phase under 35 U.S.C. §371 of International Application PCT/BE98/00099, filed Jun. 26, 1998.

FIELD OF THE INVENTION

The present invention is related to a cementitious polymeric matrix comprising silica aluminous materials having high mechanical properties and high temperature resistance properties.

The present invention is also related to a method of realisation of such a cementitious polymeric matrix comprising silica aluminous materials.

BACKGROUND OF THE INVENTION

Heat and fire resistance silica products traditionally have been prepared by energy-intensive methods that require costly high consumption of energy and carefully regulated chemical formulation, pre-heating, firing and cooling cycles to achieve reproducible quality products. Various calcium aluminate and calcined alumino cement and refractory moulding products have been produced, but none of these has achieved the combined of fast curing, high adhesive bonding qualities, low material accessibility, together with good mechanical, thermal and chemical properties.

Aims of the Present Invention

Thus, a need exists for a product that combines the above qualities with simplicity of use so as to preclude any special skill or training to accommodate the product to various uses.

A first aim of the present invention is to suggest a new product which combines properties of high mechanical resistance with high temperature resistance on the same product.

A further aim of the present invention is to suggest a product having low material cost.

A further aim of the present invention is to suggest a realisation method of such a product which has a simplicity of use so as to preclude any special skill or training to accommodate the product to various uses.

Other advantages and properties of the invention related to the product or to the method of realisation will be described hereunder in the description.

Main Characteristics of the Present Invention

The present invention relates to an alumino silicate polymer (ASP) matrix which could meet all the above-mentioned requirements.

The product of the present invention comprises two major components, which are:
- a liquid component form of alkali metal silicate aqueous solution of formula $M_2O \cdot RSiO_2 \cdot XH_2O$, in which:
  M is an alkali metal monovalent cation such as $K^+$ or $Na^+$;
  R is designated to be the molar ratio of $SiO_2/M_2O$ range comprised between 0.5/1 and 9/1; and
  X is the amount of water comprised between 30 and 70 wt %;
- a powder component form which comprises at least:
  silico-aluminous reactive raw materials composed of $Al_6Si_2O_{13}$ and $Al_2O_3 \cdot 4 SiO_2$ with a relative proportion ranging from 40 to 60 wt %, the particle size of both components ranging from 50 to 70 microns.

According to a first preferred embodiment, the preferred powder component further comprises:
  zirconium silicate flour having a particle size ranging from 50 to 70 microns, the ratio of the zirconium silicate flour being comprised between 1 and 25 wt % of the powder component.

According to another preferred embodiment, the powder component further comprises:
  pulverised raw materials being a combination of two major components which are:
  beauxite component having 80 wt % $Al_2O_3$ alumino content and having maximum grain size of 500 microns,
  chamosite component having 40 wt % $Al_2O_3$ alumino content and having an average grain size comprised between 60 and 100 microns and being of the formula such as $((Fe,Al,Mg)_6(SiAl)_4O10(OH)_8)$, the combination of beauxite chamosite components wave ratio ranging from 1/1 to 1/2 and being preferably around 1/2.

Preferably, the ratio of the raw material being comprised between 1 and 25 wt % of the powder component. Alkali metal silicate solution used in the present invention is prepared by direct reaction of alkali metal hydroxide, water ($H_2O$) and precipitated silica ($SiO_2$) through exothermic reactions. This solution can also be prepared in situ.

The required amount of the components which are mixed and the rheology of the (ASP) matrix can be adapted to various processing techniques by the eventual addition of some other filler materials.

Thus the ASP matrix can be:
  a semi-dry friable material, which can be compacted statically or dynamically into its final shape. The shape can be handled without mould prior to hardening;
  a plastic paste showing cohesion which can be calendered and compacted by rolling or which can be extruded through a die, similar to classical brick making;
  a liquid suspension of particles, which can be casted or injected in a moule.

After shaping, an increase in temperature (below 100° C.) as initial curing is required to accelerate the initial setting, and then stored for another several days as post curing, so finishing the hardening reaction within a few days leading to following advantageous properties:
  the environmental aspects are very positive such as low temperature processing, low cost raw materials, availability of raw materials together with the recycling of waste products;
  high mechanical strength, for instance, compressive strength between 40 MPA to 100 MPA (depending on formulation), and hardness above 8 Mohs;
  the most important properties of alumino-silicate polymer (ASP) materials are surely the absolute fire resistance, thermal and chemical resistance, as well as durability against weathering. It can be worked on by means of nailing, screwing, sawing and drilling, non conductivity together with the other two main properties.

The use of widely available raw materials and simple implementation techniques for the obtention of cheap and durable building materials.

The origin of the raw materials is mineral, more precisely silicate materials which are dominantly present in the earth's crust under the shape, for instance of clays or weathered materials rocks. Several types of pozzolanic materials are very suited, but also industrial waste products such as by-product pozzolans can be used.

Alumino-silicate (ASP) binding composition is always in a two components system having a powder component form from mineral origin, and a liquid component form which consisting of inorganic catalysts in solution (usually in water). When the components are mixed together, the catalysts break down the structure of the powder component, and subsequently build up an excellent cementitious polymeric structure through polymerisation or polycondensation or poly aggregation reactions. The structure of (ASP) materials is however totally inorganic polymers. The emphasis of the present invention has been placed on the development of material systems which do react at low temperatures and at atmospheric pressure, and which do lead to solid ceramic like end-products.

The cementitious property of ASP materials is attributed to the formation of:

Alkali metal tri aluminate ($M_6Al_6O_{12}$)
Alkali metal tri silicate ($M_6Si_8O_{19}$)
Alkali metal di silicate ($M_2Si_2O_5$)

In this way, the additives are used to obtain materials with typical ceramic properties, in contrast with the traditional high temperature thermal processing route.

This permits saving in energy and processing cost and offers technological advantages and open new horizon towards excellent building materials. Many traditional building materials (i.e. some organic polymer materials and other mineral base fibres), are moving from restriction towards ban, because they are recognised as extremely toxic materials or to be source of cancer. Thus, a need exists to find a replacement for those traditional banded building materials with emphasis on health and economic grounds.

The superior properties of the products of the present invention can be described as the combination of the following requirements:

1. High mechanical strength both in wet and dry conditions
2. High heat and fire resistance
3. Incombustibility
4. Extremely non-conductivity
5. High chemical resistance
6. Excellent water resistance
7. Low coefficient of thermal expansion
8. Low level of firing contraction
9. Low material cost together with simplicity of use The present invention of alumino-silicate polymer (ASP) matrix seems to meet all these requirements.

Although the specific properties of the alumino-silicate polymer (ASP) depend on the type of raw materials and additives, there are common features: hardness, stiffness, stability against weathering, chemical, heat and fire.

These properties are the required properties for an excellent construction material. The utilisation field of (ASP) materials is quite wide. It can be used as:

roofing sheets;
low cost insulation panels;
low density sandwich elements;
coating surface;
wear resistant tiles;
high strength building elements;
laminates;
flexible laminates.

The setting process of ASP binding composition involves a considerable redistribution of the constituents of the solid component form into the interstitial space occupied by inorganic solution. Thus, the polyaggregation of ASP is essentially a two-stage process in which a gelatinous layer is initially formed on the surface of the alkali metal silicate particles. After the initial setting time, this gel layer begins to spread fibrillar outgrowths which may actually be tubes, and can radiate from each grain into the interstitial space. This can be compared to the growth of silicate tress that are formed when a piece of metal or a crystal of a metal salt is placed in a solution of sodium silicate. The fibrils rapidly increase in length and number, and gradually become closely enmeshed.

Possibly, the lengthways growth ceases and the fibrils begin to join up sideways so that finally striated sheets of metal are built up. During this process, alkali metal ions from the original alkali metal silicate particles are slowly dissolving, leading to the formation of alkali metal hydroxide in the aqueous phase.

When the water of the alkali metal silicate solution becomes locally supersaturated with respect to alkali metal hydroxide form and begin to grow, so that the interstitial material eventually becomes a dense mixture of alkali metal hydroxide crystals and aggregation of alkali metal silicate gel. At this stage, the morphology can no longer be clearly distinguished.

In ASP binding matrix that has set, this matrix has a very high surface area (i.e. several hundred $m^2/gr$ which clearly indicates a high porosity that is typical of a dehydrated gel.

Both alkali metal trisilicate and disilicate have an orthosilicate structure ($_2M_2O\ SiO_2$), consisting of a framework with channels large enough to admit of penetration by water molecules. Hydrolysis produces alkali metal cations and hydroxide anions which pass into the solution leaving orthosilicis acid on the surface of the alkali metal silicate crystal:

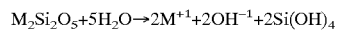

$$M_2Si_2O_5 + 5H_2O \rightarrow 2M^{+1} + 2OH^{-1} + 2Si(OH)_4$$

This suggests that the initial product of ASP grains surface is probably orthosilicic acid which will gradually polymerise to form a gel. This is followed by coagulation of the disilicate by alkali metal hydroxide, forming a membrane around the aggregated particle. As hydration continues at the surface of the particle the concentration of alkali metal cations in the solution inside the membrane rises, causing water to diffuse into the envelope under osmotic pressure, and eventually the membrane bursts open in several places releasing fresh disilicate anion $(Si_2O_5)^{-2}$ which coagulates building a hollow tubular structure similar to a "silicate garden".

Following the initial set, there is a slow increase in strength over a longer period of time due to the slow polymerisation of the disilicate and trisilicate anions to higher polymers, increasing both in quantity and in molecular weight with time. Thus, the matrix which eventually binds the residual ASP cement particles together is a hydrated polysilicate glass.

This can provide an explanation of the effect of alumina in ASP cement. At the high Ph of ASP paste, any aluminum will be present in the form of aluminate anions from alkali metal trialuminate tetra hydrate ($3M_2O.Al_2O_3.MOH.12H_2O$) can be substitute as $(Al_2O_7)^{-8}$ for some of the $(Si_2O_5)^{-2}$ which present in $(M_2Si_2O_5)$ in the polysilicate network.

This substitution produces an acid taste in the network which will accelerate the polycondensation reaction, causing a faster built-up of the covalent network and consequently a more rapid increase in mechanical strength for similar setting times.

The high heat and fire resistant properties of ASP materials are attributed to the formation of "catapleiite" such as Zirconyl alkali metal $M_2ZrSi_2O_9.2H_2O$ and/or the formation of "Erlonite-Chamosite" composite.

The following proportions of silico aluminous mineral materials are mixed uniformly with alkali metal silicate, sodium and/or potassium silicate and then mixed uniformly with all other ingredients with are set forth as well as the more specific and preferred proportions.

Description of Preferred Embodiments of the Present Invention

The preferred embodiments of the present invention are described hereunder in several examples using ranges of operable proportions of the several ingredients needed to reach the aim of the present invention.

EXAMPLE 1

Liquid Component

Water, precipitated silica and alkali metal hydroxide such as potassium hydroxide and/or sodium hydroxide are charged into a stainless steel or PVC vessel equipped with a cover.

| | Parts by weight | |
|---|---|---|
| | Range | Preferred embodiment |
| Potassium hydroxide | 5–100 | 16.35 |
| Precipitated silica $SiO_2$ | 10–60 | 28.3 |
| Water | 30–70 | 55.35 |

The solution can be described as formula $K_2O.RSiO_2.XH_2O$, in which R is designated to be the molar ratio of $SiO_2/K_2O$ ranging from 0.5/1 to 9/1, and is preferably around 3.

The optimum $SiO_2$ concentration as described in this example is 28.3 mass % with a modulus of 2.91 and of about 55% water content.

During the initial mixing of these ingredients, evolution of heat raises the temperature of the content of the vessel in such a way that an exothermic reaction takes place over a period of time which may vary from two to three hours.

After the exothermic reaction, the contents are slowly cooled which may take another ninety minutes.

EXAMPLE 2

ASP Matrix

| | Parts by weight | |
|---|---|---|
| | Range | Preferred embodiment |
| Liquid component of example 1 | 5–25 | 15 |
| Calcined clay of high silico aluminous minerals with $Al_6Si_2O_{13}$—$Al_2O_3.4\ SiO_2$ of average particle size ranging from 50 to 70 microns | 4–20 | 12 |
| Zirconium silicate flour with particle size ranging from 50 to 70 microns | 10–40 | 25 |
| Pulverised raw materials of 40 to 80 wt % $Al_2O_3$ alumino content with grain size ranging from 80 to 500 microns | 0–50 | 5 |

The product of this formulation exhibits properties such as:

reversible thermal expansion 0.36% (20° C.–1150° C.)

cold bending strength 6 $MN/m^2$ hot bending strength 5 $MN/m^2$ (at 1150° C.)

water absorption 13 mass % hardness 9 Mohs

EXAMPLE 3

Liquid Component

A solution is prepared in a manner similar to that described in example 1, except that it is made from the following ingredients

| | Parts by weight | |
|---|---|---|
| | Range | Preferred embodiment |
| Sodium hydroxide | 3–100 | 11.1 |
| Precipitated silica $SiO_2$ | 10–80 | 27.7 |
| Water | 30–90 | 61.2 |

The solution can be described as formula $Na_2O.RSiO_2.XH_2O$, in which R is designated to be the molar ratio of $SiO_2/Na_2O$ ranging from 0.5/1 to 9/1, and is preferably around 3,5.

The optimum $SiO_2$ concentration as described in the liquid component is 27.7 mass % with a modulus of 3.33 and about 61% water content.

EXAMPLE 4

ASP Matrix

| | Parts by weight | |
|---|---|---|
| | Range | Preferred embodiment |
| Liquid component of example 3 | 5–25 | 18 |
| Calcined clay of high silico aluminous minerals with $Al_6Si_2O_{13}$—$Al_2O_3.4\ SiO_2$ of average particle size ranging from 50 to 70 microns | 4–20 | 12 |
| Zirconium silicate flour with particle size ranging from 50 to 70 microns | 10–40 | 25 |
| Pulverised raw materials with 40 to 80 wt % $Al_2O_3$ alumino content of grain size ranging from 80 to 500 microns | 0–50 | 5 |

The product of this formulation exhibits properties such as:

reversible thermal expansion 0.32% (20° C.–1150° C.)
cold bending strength 5 MN/m$^2$
hot bending strength 4 MN/m$^2$ (at 1150° C.)
water absorption 10 mass %
hardness 9 Mohs

EXAMPLE 5

Liquid Component

A solution is prepared in a manner similar to that described in example 1, except that it is made from the following ingredients:

|  | Parts by weight | |
|---|---|---|
|  | Range | Preferred embodiment |
| Potassium hydroxide | 5–100 | 23.7 |
| Precipitated silica SiO$_2$ | 10–60 | 23.7 |
| Water | 30–70 | 52.6 |

The solution can be described as formula K$_2$O.RSiO$_2$.XH$_2$O, in which R is designated to be the molar ratio of SiO$_2$/K$_2$O ranging from 0.5/1 to 9/1, and is preferably around 2.

The optimum SiO$_2$ concentration as described in the liquid component is 23.7 mass % with a modulus of 1.83 and about 53% water content.

EXAMPLE 6

ASP Matrix

|  | Parts by weight | |
|---|---|---|
|  | Range | Preferred embodiment |
| Liquid component of example 5 | 5–25 | 15 |
| Calcined clay of high silico aluminous minerals with Al$_6$Si$_2$O$_{13}$—Al$_2$O$_3$.4 SiO$_2$ of average particle size ranging from 50 to 70 microns | 5–15 | 10 |
| Zirconium silicate flour with particle size ranging from 50 to 70 microns | 0–20 | 2 |
| Pulverised raw materials with 40 to 80 wt % Al$_2$O$_3$ alumino content of grain size ranging from 80 to 500 microns | 5–25 | 15 |

The product of this formulation exhibits properties such as:

heat and fire resistance together with low thermal conductivity
dry bending strength=9 MN/m$^2$
dry compressive strength=50 MN/m$^2$
wet bending strength=9 MN/m$^2$
wet compressive strength=48 MN/m$^2$
hardness=8 Mohs.
superior binding qualities when it is used as coating composition or reinforced by tiers

EXAMPLE 7

Liquid Component

A solution is prepared in a manner similar to that described in example 1, except that it is made from the following ingredients:

|  | Parts by weight | |
|---|---|---|
|  | Range | Preferred embodiment |
| Sodium hydroxide | 3–100 | 21.3 |
| Precipitated silica SiO$_2$ | 10–80 | 26.4 |
| Water | 30–90 | 52.3 |

The solution can be described as formula Na$_2$O.RSiO$_2$.XH$_2$O, in which R is designated to be the molar ratio of SiO$_2$/Na$_2$O ranging from 0.5/1 to 9/1, and is preferably around 1,6.

The optimum SiO$_2$ concentration as described in the liquid component is 26.4 mass % with a modulus of 1.61 and about 52% water content.

EXAMPLE 8

ASP Matrix

|  | Parts by weight | |
|---|---|---|
|  | Range | Preferred embodiment |
| Liquid component of example 7 | 5–25 | 18 |
| Calcined clay of high silico aluminous minerals with Al$_6$Si$_2$O$_{13}$—Al$_2$O$_3$.4 SiO$_2$ of average particle size ranging from 50 to 70 microns | 5–15 | 10 |
| Zirconium silicate flour with particle size ranging from 50 to 70 microns | 0–20 | 2 |
| Pulverised raw materials with 40 to 80 wt % Al$_2$O$_3$ alumino content of grain size ranging from 80 to 500 microns | 5–25 | 15 |

The product of this formulation exhibits properties which are very similar to the product of example

What is claimed is:

1. A cementitious matrix comprising an alumino silicate polymer comprising:

a liquid component comprising an aqueous solution of an alkali metal silicate having the formula M$_2$O.RSiO$_2$.XH$_2$O, wherein:

M is an alkali metal monovalent cation;
R is the molar ratio of SiO$_2$/M$_2$O, wherein the molar ratio is between 0.5/1 and 9/1; and
X is the amount of water in the liquid component, where the amount of water in the liquid component is between 30 and 70 wt %; and a powder component which comprises:
silico-aluminous reactive raw materials comprising Al$_6$Si$_2$O$_{13}$ and Al$_2$O$_3$.4SiO$_2$ with a relative proportion ranging from 40 to 60 wt %, the particle size of both components ranging from 50 to 70 microns and zirconium silicate flour having a particle size ranging from 50 to 70 microns, wherein the zirconium silicate flour comprises between 1 and 25 wt % of the total weight of the powder component 2. A cementitious matrix according to claim 1, wherein the powder component further comprises pulverized raw materials comprising two major components:
   a bauxite component having 80 wt % $Al_2O_3$ alumino content and having a maximum grain size of 500 microns; and
   a chamosite component having 40 wt % $Al_2O_3$ alumino content and having an average grain size between 60 and 100 microns,
   wherein the bauxite chamosite weight ratio ranges from 1/1 to 1/2, and wherein the raw materials comprise between 1 and 25 wt % of the total weight of the powder component.

3. A cementitioui matrix according to claim 2, further comprising alumino siliceous finely divided waste material.

4. A cementitious matrix according to claim 2, further comprising flake-shaped material.

5. A cementitious matrix according to claim 2, further comprising natural cellulose and protein base fibers.

6. A cementitious matrix according to claim 1, further comprising man-made organic or inorganic base fibers.

7. A cementitious matrix according to claim 1, further comprising natural fibers of mineral origin.

8. A cementitious matrix according to claim 1, further comprising heat treated natural material.

9. A cementitious matrix according to claim 1, further comprising untreated synthetic raw material.

10. A cementitious matrix according to claim 1, further comprising treated synthetic raw material.

11. A cementitious matrix according to claim 2, further comprising silica sand and silica flour as filler.

12. A cementitious matrix according to claim 1, further comprising natural or synthetic organic base waste material.

13. A cementitious matrix according to claim 11, further comprising gas-forming agents.

14. A cementitious matrix according to claim 11, further comprising inorganic or organic coloring agents.

15. A cementitious matrix according to claim 1, further comprising inert material.

16. A cementitious matrix according to claim 1, wherein the alkali metal monovalent cation is $K^+$ or $Na^+$.

17. A cementitious matrix according to claim 2, wherein said chamosite component has the formula $(Fe,Al,Mg)_6(SiAl)_4O_{10}(OH)_8$.

18. A cementitious matrix according to claim 2, wherein the bauxite chamosite weight ratio is around 1/2.

19. A cementitious matrix according to claim 3, wherein the alumino siliceous finely divided waste material is pulverized fuel ash.

20. A cementitious matrix according to claim 4, wherein the flake-shaped material is mica.

21. A cementitious matrix according to claim 5, wherein the natural cellulose and protein base fibers are selected from the group consisting of flax, hemp, and wool fibers.

22. A cementitious matrix according to claim 6, wherein the man-made organic or inorganic base fibers are selected from the group consisting of polyesters, polypropylene, glass, and ceramic fibers.

23. A cementitious matrix according to claim 8, wherein the heat treated natural material is expanded perlite or expanded vermiculite.

24. A cementitious matrix according to claim 9, wherein the untreated synthetic raw material is crushed brick.

25. A cementitious matrix according to claim 10, wherein the treated synthetic raw material is expanded polystyrene.

26. A cementitious matrix according to claim 12, wherein the natural or synthetic organic base waste material is selected from the group consisting of saw dust, rice husk, and recycled organic waste.

27. A cementitious matrix according to claim 13, wherein the gas-forming agent is $H_2O_2$.

28. A cementitious matrix according to claim 14, wherein the inorganic or organic coloring agents are pigments.

29. A cementitious matrix according to claim 15, wherein the inert material is pulverized limestone.

* * * * *

UNITED STATES PATENT AND TRADEMARK OFFICE
CERTIFICATE OF CORRECTION

PATENT NO. : 6,419,737 B1
DATED : July 16, 2002
INVENTOR(S) : Haji

It is certified that error appears in the above-identified patent and that said Letters Patent is hereby corrected as shown below:

Column 9,
Line 14, please replace "cementitioui" with -- cementitious --.

Signed and Sealed this

First Day of July, 2003

JAMES E. ROGAN
*Director of the United States Patent and Trademark Office*